United States Patent [19]

Perrier et al.

[11] 3,734,685
[45] May 22, 1973

[54] CATALYSIS OF THE CELLULOSE-CYCLIC UREA REACTIONS BY BUILT-IN ACID GROUPS

[75] Inventors: Dorothy M. Perrier; Ruth R. Benerito, both of New Orleans, La.

[73] Assignee: The United States of America as represented by the Secretary of Agriculture, Washington, D.C.

[22] Filed: Mar. 15, 1972

[21] Appl. No.: 234,960

[52] U.S. Cl. ........................... 8/129, 8/116.3, 8/120, 260/231 A, 260/232
[51] Int. Cl. ..................... D06m 13/20, D06m 15/58, D06m 15/72
[58] Field of Search .......................8/129, 116.3, 120

[56] References Cited

OTHER PUBLICATIONS

Daul et al., Textile Research Journal 22, 792–797 (1952)
Soignet et al., Textile Research Journal 38, 1143 (1968)
Soignet et al., Textile Research Journal 39, 780–787 (1969)
Perrier et al., Textile Research Journal 41, 680–685 (1971)
Perrier et al., Textile Research Journal 42, 167–171 (1972)

*Primary Examiner*—George F. Lesmes
*Assistant Examiner*—James Cannon
*Attorney*— R. Hoffman and W. Bier

[57] ABSTRACT

Sulfonic acid groups in sulfonoethylated cotton act as built-in catalysts for the reaction of cotton with substituted cyclic ureas. The cotton in the acid form did not require an additional catalyst for its reaction in aqueous media with dimethylolethylene urea, dimethylolpropylene urea, dihydroxyethylene urea, and dimethyloidihydroxyethylene urea. The strong acid groups of SE-cotton were more effective than carboxylic or phosphonic acid groups of carboxymethylated and phosphonomethylated cottons of like degree of substitution with each urea.

5 Claims, No Drawings

CATALYSIS OF THE CELLULOSE-CYCLIC UREA REACTIONS BY BUILT-IN ACID GROUPS

A non-exclusive, irrevocable, royalty-free license in the invention herein described, throughout the world for all purposes of the United States Government, with the power to grant sublicenses for such purposes, is hereby granted to the Government of the United States of America.

Sulfonoethyl substituents in cotton were used as built-in catalytic sites for reactions of cellulose hydroxyls with N-methylolated cyclic ureas and dihydroxyethyleneurea. Cation-exchange cottons, such as carboxymethylated and phosphonomethylated cotton, were not as effective in self-catalyzed reactions with the cyclic ureas and did not result in improved wrinkle-recovery values comparable to those obtained with sulfonoethylated cottons.

It is well known in the prior art that the cellulose hydroxyls will react with substituted cyclic ureas in the presence of a catalyst. Usually these catalysts are added to the reagent solution and padded on to the fabric. Ammonium salts, especially the hydrochlorides of ammonium salts, or metal salts have been used previously to catalyze N-methylol cyclic ureas onto cotton cellulose to produce wash-wear and permanent press garments. Once, however, the solution of the catalyst and the cyclic urea are padded onto the fabric and the fabric dried at low temperature, below 70°C, the reaction between the cyclic urea and the cellulose will proceed rapidly on the application of heat or at a somewhat slower rate at room temperature. The possibility of padding the cyclic urea and catalyst on a fabric and then storing it for long periods of time before curing is negated due to the reactivity of the cyclic urea at storage temperature.

The process described in the instant invention differs from the prior art in that the catalyst is incorporated first as an integral part of the cellulose matrix and thus is separated from the cyclic urea. The fabric padded in this manner will not react appreciably with the cyclic urea during storage at or near room temperature but will react immediately upon curing at high temperatures, i.e., greater than 100°C. It is then possible to store the fabrics with the adhered reagent and pendant sulfonoethylated groups at or near room temperature, fashion the fabric into garments and then cure the garment without fear of premature crosslinking the fabric. The garment after curing will have permanent press properties which will maintain a wrinkle free look even after repeated launderings.

In carrying out the preferred process of this invention, cellulosic fabric was twice padded to 100 percent wet pickup of a solution which is 0.05 M with respect to the sodium salt of 2-chloroethylsulfonic acid and 10 percent with respect to sodium hydroxide. The padded fabric was then cured at 125°C for 5 minutes. Unreacted reagent was removed by soaking the fabric in dilute acetic acid and washing in tap water. The fabric was then dried at 125°C for 5 minutes. To insure that the fabric was completely in the required acid form, it was soaked in 2% HCl for 4 hours. The fabric was thoroughly washed in tap water and then deionized water to remove all traces of HCl. The fabric was then ironed dry and air equilibrated.

The fabric prepared above was then twice padded to a 100 percent wet pickup in an aqueous solution containing 10 weight percent of a cyclic urea selected from the group consisting of dimethylolethyleneurea (DMEU), dimethylolpropyleneurea (DMPU), dihydroxyethyleneurea (DHEU), and dimethyloldihydroxyethyleneurea (DMDHEU), dried at 60°C for 7 minutes and then allowed to stand for periods up to 50 days before curing at 160°C for 5 minutes.

Cellulosic materials such as cotton, rayon, ramie, jute, and flax and in the form of fiber, yarn, fabric or powder may be used in the process of this invention. The degree of crosslinking in the ion exchanged, powdered, sulfonoethylated cellulose can also be increased by the process of this invention.

The following examples illustrate but do not limit the scope of this invention. All percents are by weight. Breaking strength tests were carried out according to the ASTM Method D1682-64. Conditioned (dry) wrinkle recovery measured was determined according to the ASTM D1295-67 method and the wet recoveries according to the method described by Fujimoto, R. A., et al., Am. Dyestuff Reporter, 52, 329, 1963.

EXAMPLE 1

Cotton printcloth (80×80) was twice padded to 100 percent wet pickup of a solution which was 0.85 M with respect to the sodium salt of 2-chloroethylsulfonic acid and 10 percent with respect to NaOH, then was cured at 125°C for 5 minutes. Unreacted reagent was then removed by soaking the fabric in dilute (5–10 percent) acetic acid and washing in tap water for 30 minutes. The fabric was then dried at 125°C for 5 minutes. To insure that the fabric was completely in the acid form, it was then soaked for 4 hours in 2% HCl and washed thoroughly with tap water, followed by rinsing with ion free water to remove all traces of unbound HCl. The fabric was then dried by ironing followed by air equilibration. The fabric had a sulfur content of 1.3 percent with a dry and wet wrinkle recovery (W+F) of 194° and 198°, respectively. The fabric was then twice padded to 100 percent wet pickup of a 10 percent solution of dimethylolethyleneurea, dried at 60°C for 7 minutes, and then portions of the fabric were allowed to stand at room temperature for varying times. The following table illustrates the results obtained after time intervals up to 50 days, with and without curing.

TABLE 1

| Storage Time Days | Cured (C) or Uncured | Nitrogen % | Formaldehyde % | Wrinkle Recovery (W+F)° | |
|---|---|---|---|---|---|
| | | | | Dry | Wet |
| 0 | U | 0.04 | 0 | 197 | 209 |
| 0 | C | 1.49 | 2.53 | 274 | 273 |
| 8 | U | 0.36 | 0.58 | 215 | 231 |
| 8 | C | 1.48 | 2.40 | 266 | 275 |
| 15 | U | 0.60 | 0.76 | 224 | 259 |
| 15 | C | 1.51 | 2.43 | 279 | 263 |
| 22 | U | 0.90 | 1.53 | 230 | 296 |
| 22 | C | 1.58 | 2.47 | 272 | 254 |
| 29 | U | 1.06 | 1.61 | 222 | 277 |
| 29 | C | 1.56 | 2.05 | 282 | 272 |
| 36 | U | 1.10 | 1.77 | 222 | 286 |
| 36 | C | 1.58 | 2.69 | 271 | 292 |
| 43 | U | 1.11 | 2.07 | 214 | 279 |
| 43 | C | 1.53 | 2.92 | 259 | 280 |
| 50 | U | 1.21 | 2.12 | 214 | 287 |
| 50 | C | 1.58 | 2.77 | 274 | 290 |

The fabrics had a good hand and maintained their high wrinkle recovery and permanent press appearance through several home-type launderings. It can be seen that the fabric did not attain a high dry recovery (above 250° (W+F))even after 50 days storage. Only after curing at 160°C for 5 minutes, did the fabric attain these high dry wrinkle recoveries necessary to have a smooth appearance after home-type washing and tumble or line drying.

EXAMPLE 2

An 80 × 80 cotton printcloth fabric was treated as in Example 1 except dimethylolpropyleneurea was used as the crosslinking agent. Results are shown in Table II.

TABLE II

| Storage Time Days | Cured (C) or Uncured (U) | Nitrogen % | Formaldehyde % | Wrinkle Recovery (W+F)° Dry | Wet |
|---|---|---|---|---|---|
| 0 | U | 0.021 | 0.025 | 194 | 210 |
| 0 | C | 1.176 | 2.158 | 267 | 288 |
| 14 | U | 0.694 | 1.173 | 217 | 250 |
| 14 | C | 1.222 | 1.852 | 244 | 277 |
| 28 | U | 0.845 | 1.576 | 212 | 288 |
| 28 | C | 1.239 | 1.970 | 272 | 303 |
| 42 | U | 0.861 | 1.761 | 227 | 291 |
| 42 | C | 1.197 | 2.338 | 273 | 289 |

EXAMPLE 3

An 80 × 80 cotton printcloth fabric was treated as in Example 1 except dimethyloldihydroxyethyleneurea was used as the crosslinking agent. Results are shown in Table III.

TABLE III

| Storage Time Days | Cured (C) or Uncured (U) | Nitrogen % | Formaldehyde % | Wrinkle Recovery (W+F)° Dry | Wet |
|---|---|---|---|---|---|
| 0 | U | 0.02 | 0.029 | 189 | 215 |
| 0 | U | 1.01 | 1.74 | 257 | 274 |
| 14 | U | 0.24 | 0.45 | 203 | 228 |
| 14 | C | 1.12 | 2.08 | 296 | 278 |
| 28 | U | 0.506 | 0.89 | 208 | 252 |
| 28 | C | 1.16 | 2.13 | 290 | 261 |
| 42 | U | 0.57 | 0.89 | 208 | 255 |
| 42 | C | 1.27 | 2.20 | 283 | 280 |

EXAMPLE 4

An 80 × 80 cotton printcloth was treated with 2-chloroethylsulfonic acid as in Example 1. The fabric was padded with 10 percent dihydroxyethyleneurea, dried at 60°C for 7 minutes and cured at different temperatures for 5 minutes. Effect of temperature and time of wash on properties of sulfonoethylated cotton treated with 10% DHEU are shown in Table IV.

TABLE IV

Effect of Temperature and Time of Wash on Properties of Sulfonoethylated Cotton Treated with 10% DHEU [1]

| Cure temperature, °C. | Wash treatment [2] | N, wt. percent | Wrinkle recovery (W+F), deg. Wet | Cond. | Breaking strength, lb. | Elongation, percent | Abrasion resistance cycles |
|---|---|---|---|---|---|---|---|
| 25 [3] | Immediate | 0 | 209 | 187 | 41 | 16 | 351 |
|  | Delay | 0.33 | 240 | 207 | 21 | 14 | 733 |
| 100 | Immediate | 0 | 202 | 187 | 32 | 18 | 355 |
|  | Delay | 0.12 | 227 | 215 | 33 | 17 | 612 |
| 120 | Immediate | 0.18 | 214 | 188 | 40 | 18 | 418 |
|  | Delay | 0.27 | 240 | 201 | 24 | 18 | 440 |
| 160 | Immediate | 1.24 | 288 | 222 | 30 | 16 | 350 |
|  | Delay | 1.08 | 293 | 230 | 20 | 16 | 324 |
| SE-control |  |  | 198 | 194 | 37 | 16 | 298 |

[1] Specimens were padded with 10% DHEU, dried at 60° C. for 7 min., and cured at stated temperatures for 5 min.
[2] After cure, fabrics were either washed immediately or the wash process was delayed for 6 weeks during which time fabrics were stored at room temperature and humidity.
[3] Fabrics received no cure and were stored at room temperature.

We claim:

1. A process for reacting cotton fabric with N-methylolated cyclic ureas to give a fabric with improved wrinkle-recovery values and improved abrasion resistance, said process comprises:
   a. padding a cotton fabric with the sodium salt of 2-chloroethylsulfonic acid,
   b. curing the fabric from (a),
   c. treating the cured fabric from (b) with a cyclic urea selected from the group consisting of dimethylolethyleneurea, dihydroxyethyleneurea, dimethylolpropyleneurea, and dimethyloldihydroxyethyleneurea,
   d. curing the fabric from (c), 2. The process of claim 1 wherein the cyclic urea is dimethylolethyleneurea.

3. The process of claim 1 wherein the cyclic urea is dihydroxyethyleneurea.

4. The process of claim 1 wherein the cyclic urea is dimethylolpropyleneurea.

5. The process of claim 1 wherein the cyclic urea is dimethyloldihydroxyethyleneurea.

* * * * *